United States Patent
Um et al.

(10) Patent No.: US 9,259,997 B2
(45) Date of Patent: Feb. 16, 2016

(54) STRUCTURE OF CENTER REINFORCEMENT FOR PANORAMA SUNROOF

(71) Applicants: Hyundai Motor Company, Seoul (KR); Inalfa Roof Systems Group B.V., AB Venray (NL)

(72) Inventors: Sang-Sub Um, Yongin-shi (KR); Do-Won Sung, Suwon-shi (KR); Sun-Gyu Hwang, Hwasung-shi (KR)

(73) Assignees: Hyundai Motor Company, Seoul (KR); Inalfa Roof Systems Group B.V., AB Venray (NL)

( * ) Notice: Subject to any disclaimer, the term of this patent is extended or adjusted under 35 U.S.C. 154(b) by 0 days.

(21) Appl. No.: 14/509,982

(22) Filed: Oct. 8, 2014

(65) Prior Publication Data

US 2015/0151617 A1 Jun. 4, 2015

(30) Foreign Application Priority Data

Dec. 4, 2013 (KR) .................... 10-2013-0149856

(51) Int. Cl.
*B62D 25/06* (2006.01)
*B60J 7/043* (2006.01)
*B60J 10/12* (2006.01)

(52) U.S. Cl.
CPC ...... *B60J 7/043* (2013.01); *B60J 10/12* (2013.01); *B62D 25/06* (2013.01)

(58) Field of Classification Search
CPC ........................................... B60J 7/043
USPC ......... 296/216.01–224, 203.01, 203.03, 210; 52/843, 844, 845, 848
See application file for complete search history.

(56) References Cited

U.S. PATENT DOCUMENTS

| 6,115,986 A | * | 9/2000 | Kelly | 52/481.1 |
| 2010/0045075 A1 | * | 2/2010 | Mack et al. | 296/215 |
| 2011/0057482 A1 | | 3/2011 | Mathes et al. | |

FOREIGN PATENT DOCUMENTS

| JP | 2007-55289 A | 3/2007 |
| KR | 20-0158285 Y1 | 10/1999 |

* cited by examiner

*Primary Examiner* — Dennis H Pedder
(74) *Attorney, Agent, or Firm* — Morgan, Lewis & Bockius LLP

(57) ABSTRACT

Disclosed is a center reinforcement structure of a panoramic sunroof that is coupled in a vehicle width direction between a front glass and a rear glass disposed at a ceiling of a vehicle. The center reinforcement structure may include a frame which is disposed in the vehicle width direction, and has one end that is tightly attached and fixedly coupled to a lower portion of the rear glass, and a first center reinforcement which is coupled to a lower portion of the frame, and has a first closed cross-sectional portion that is formed at one side of the first center reinforcement by sequentially bending a first plate to provide a first closed space, and a first joint portion that is formed at the other side of the first center reinforcement by overlapping both ends of the first plate substantially in parallel so that both ends of the first plate are in surface contact with each other.

8 Claims, 4 Drawing Sheets

STRUCTURE OF CENTER REINFORCEMENT FOR PANORAMA SUNROOF

CROSS-REFERENCE TO RELATED APPLICATIONS

The present application claims priority of Korean Patent Application Number 10-2013-149856 filed on Dec. 4, 2013, the entire contents of which application are incorporated herein for all purposes by this reference.

BACKGROUND OF INVENTION

1. Field of Invention

The present invention relates to a center reinforcement structure of a panoramic sunroof which is coupled in a vehicle width direction between a front glass and a rear glass, and more particularly, to a center reinforcement structure of a panoramic sunroof which includes a first center reinforcement which is coupled to a lower portion of a frame, and has a first closed cross-sectional portion that is formed at one side of the first center reinforcement by sequentially bending a plate so as to provide a closed space, and a first joint portion that is formed at the other side of the first center reinforcement by overlapping both ends of the plate in parallel or substantially in parallel so that both the ends of the plate are in surface contact with each other, thereby improving rigidity of a center portion of a panoramic sunroof, and reducing a size of the center reinforcement structure.

2. Description of Related Art

An opening portion may be formed in a roof panel of a vehicle in order to discharge air inside the vehicle to the outside and allow air outside the vehicle to flow into the vehicle, and the opening portion is openable or closable by a sunroof glass that is installed at a ceiling of the vehicle.

The sunroof is manufactured to ventilate the interior of the vehicle and allow openness, and manufactured through a heat treatment process so as to withstand intense sunlight. The sunroof may be made of glass that effectively blocks ultraviolet rays and infrared rays, or may be made of a high strength material in order to prevent an occupant from being injured due to glass fragments at the time of a vehicle accident.

Particularly, recently, a panoramic sunroof, in which most of the roof panel is manufactured using glass, and a part of the roof panel is selectively opened and closed, is being widely used for the purpose of allowing openness and enhancing aesthetic design.

The virtue of this panoramic sunroof allows the driver to have a large amount of natural sunlight when the vehicle is driven or stopped, and the driver may enjoy driving the vehicle by opening the panoramic sunroof when the vehicle is traveling.

The aforementioned panoramic sunroof includes a front glass which slides to be openable and closable at a front side of the ceiling of the vehicle, and a rear glass which is fixed at a rear side of the ceiling of the vehicle.

As illustrated in FIG. 1, a frame 3 is coupled in a vehicle width direction between the front glass 1 and the rear glass 2 so as to serve to seal a gap between the front glass 1 and the rear glass 2, fix the rear glass 2, and connect left and right side frames.

A center reinforcement 4, which is made of steel and formed in a plate shape having rigid foam and beads, is coupled to a lower portion of the frame 3 in order to reinforce rigidity of the frame 3, and a center cover 5 is disposed below the center reinforcement 4.

However, a center reinforcement structure of the panoramic sunroof in the related art is configured as an open cross-sectional structure such that rigidity of the frame cannot be sufficiently reinforced, and as a result, a thickness of the center reinforcement structure is increased such that production cost and a vehicle weight are increased.

A length, that is, a width of the center reinforcement in a forward and rearward direction is too long such that a width of a center portion of the panoramic sunroof becomes greater overall, and as a result, openness of an occupant seated on a back seat of the vehicle is hindered.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a center reinforcement structure of a panoramic sunroof which increases rigidity of a center portion of the panoramic sunroof, reduces production cost and a vehicle weight by reducing a package size, and improves openness for an occupant seated in a vehicle.

Various aspects of the present invention provide a center reinforcement structure of a panoramic sunroof which is coupled in a vehicle width direction between a front glass and a rear glass that are disposed at a ceiling of a vehicle. The center reinforcement structure may include: a frame which is disposed in the vehicle width direction, and has one end that is tightly attached and fixedly coupled to a lower portion of the rear glass; and a first center reinforcement which is coupled to a lower portion of the frame, and has a first closed cross-sectional portion that is formed at one side of the first center reinforcement by sequentially bending a first plate so as to provide a first closed space, and a first joint portion that is formed at the other side of the first center reinforcement by overlapping both ends of the first plate substantially in parallel so that both ends of the first plate are in surface contact with each other.

An upper surface of the first closed cross-sectional portion of the first center reinforcement may be joined to one side of a lower surface of the frame by welding or a sealer, and an upper surface of the first joint portion of the first center reinforcement may be joined to the other side of the lower surface of the frame by welding or a sealer.

One side surface of the first closed cross-sectional portion may be formed as an inclined surface having a predetermined angle with respect to a vertical direction, and the first closed cross-sectional portion may have a cross section having a substantially trapezoidal shape.

The center reinforcement structure of the panoramic sunroof may further include: a second center reinforcement which is coupled between the frame and the first center reinforcement, and has a second closed cross-sectional portion that is formed at one side of the second center reinforcement by sequentially bending a second plate so as to provide a second closed space, and a second joint portion that is formed at the other side of the second center reinforcement by overlapping both ends of the second plate substantially in parallel so that both ends of the second plate are in surface contact with each other, in which the second center reinforcement and the first center reinforcement are substantially symmetrically disposed with respect to a vertical axis and a horizontal axis, and a lower surface of the second closed cross-sectional portion is joined to an upper surface of the first joint portion, and a lower surface of the second joint portion is joined to an upper surface of the first closed cross-sectional portion, such that a third closed cross-sectional portion is formed between the first closed cross-sectional portion and the second closed cross-sectional portion.

The lower surface of the second closed cross-sectional portion of the second center reinforcement may be joined to the upper surface of the first joint portion of the first center reinforcement by welding or a sealer, and the lower surface of the second joint portion of the second center reinforcement may be joined to the upper surface of the first closed cross-sectional portion of the first center reinforcement by welding or a sealer.

One side surface of the first closed cross-sectional portion may be formed as a first inclined surface having a first predetermined angle with respect to the vertical direction, one side surface of the second closed cross-sectional portion, which faces the first inclination surface of the first closed cross-sectional portion, is formed as a second inclined surface having a second predetermined angle with respect to the vertical direction, and the first predetermined angle and the second predetermined angle are substantially equal to each other.

The third closed cross-sectional portion may be surrounded by the first closed cross-sectional portion, the first joint portion, the second closed cross-sectional portion, and the second joint portion, the first inclined surface of the first closed cross-sectional portion and the second inclined surface of the second closed cross-sectional portion may be disposed substantially in parallel with each other, and the first joint portion and the second joint portion may be disposed substantially in parallel with each other, such that a cross section of the third closed cross-sectional portion may be formed in a substantially parallelogram shape.

The center reinforcement structure of the panoramic sunroof may further include: a center cover which is coupled to a lower portion of the first center reinforcement, and has a 'U'-shaped cross section, in which both ends of the cross section of the center cover are bent inward.

According to various apsects of the present invention, the center reinforcement has the closed cross-sectional portion that is formed at one side of the center reinforcement by sequentially bending a plate, and the joint portion that is formed at the other side of the center reinforcement by overlapping both ends of the plate in parallel or substantially in parallel so that both ends of the plate are in surface contact with each other, thereby allowing the center reinforcement to utilize a small outer peripheral area, and increasing rigidity.

Since rigidity of the center reinforcement is increased, the center reinforcement may be formed to have a small size, thereby reducing an overall production cost of the panoramic sunroof and a vehicle weight.

Rigidity of the center reinforcement is increased, and a size of the center reinforcement is decreased, thereby reducing a width of a center portion of the panoramic sunroof, and improving openness of an occupant seated on a back seat in the vehicle.

The lower surface of the frame of the panoramic sunroof may be joined to both sides of the upper surface of the center reinforcement by welding or a sealer in a surface contact manner, thereby increasing joint rigidity of the center reinforcement.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figure 1:
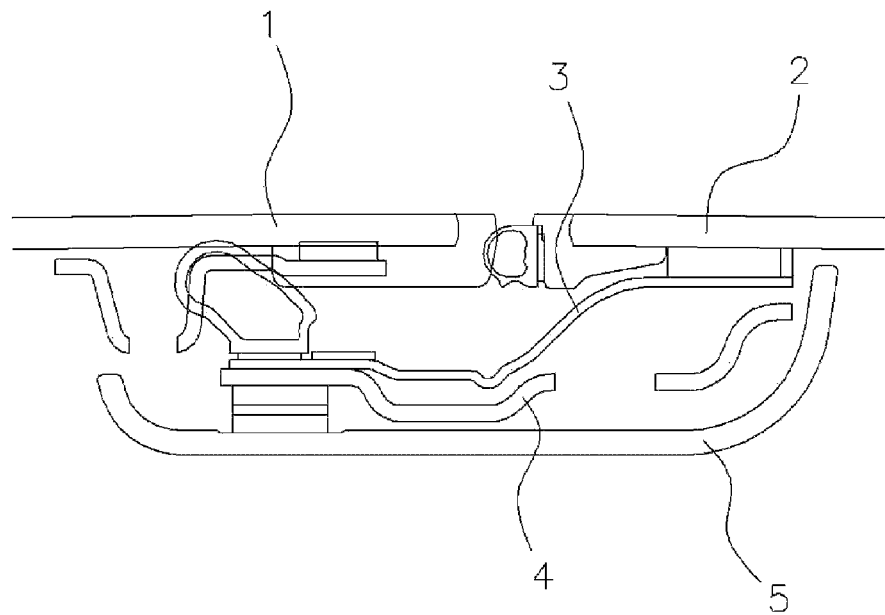
FIG. 1 is a cross-sectional view illustrating an appearance of a center portion of a panoramic sunroof in the related art.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A center reinforcement structure of a panoramic sunroof according to various embodiments of the present invention is a center reinforcement structure of a panoramic sunroof which is coupled in a vehicle width direction between a front glass 10 and a rear glass 12 that are disposed at a ceiling of a vehicle, and includes: a frame 20 which is disposed in the vehicle width direction, and has one end that is tightly attached and fixedly coupled to a lower portion of the rear glass 12; and a first center reinforcement 30 which is coupled to a lower portion of the frame 20, and has a first closed cross-sectional portion 31 that is formed at one side of the first center reinforcement 30 such as by sequentially bending a plate so as to provide a closed space, and a first joint portion 37 that is formed at the other side of the first center reinforcement 30 by overlapping both ends of the plate in parallel or substantially in parallel so that both the ends of the plate are in surface contact with each other.

Figure 2:
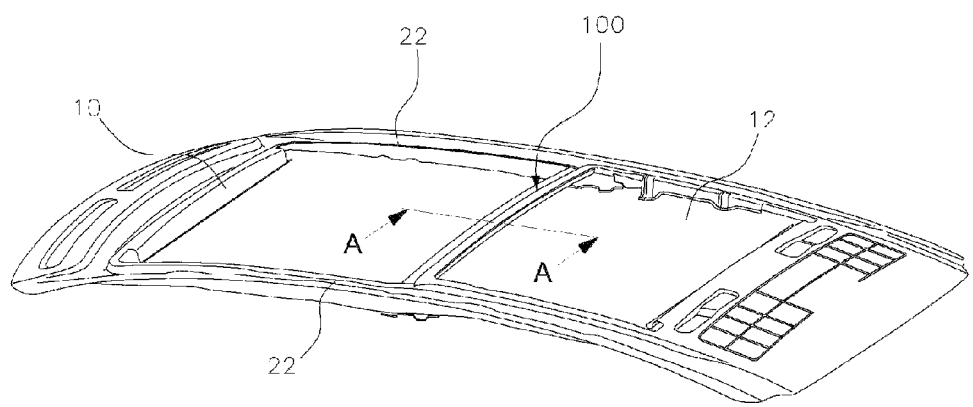
FIG. 2 is a perspective view illustrating an appearance in which an exemplary center reinforcement of a panoramic sunroof according to the present invention is coupled to a vehicle body.

As illustrated in FIG. 2, the front glass 10, which slides by a motor or the like, is installed at a front side of the ceiling of the vehicle, and the rear glass 12, which is in a fixed state, is coupled at a rear side of the ceiling of the vehicle.

A center portion 100 of the panoramic sunroof is coupled in the vehicle width direction between the front glass 10 and the rear glass 12 so as to serve to connect left and right side frames 22, and support the front glass 10 and the rear glass 12.

Figure 3:
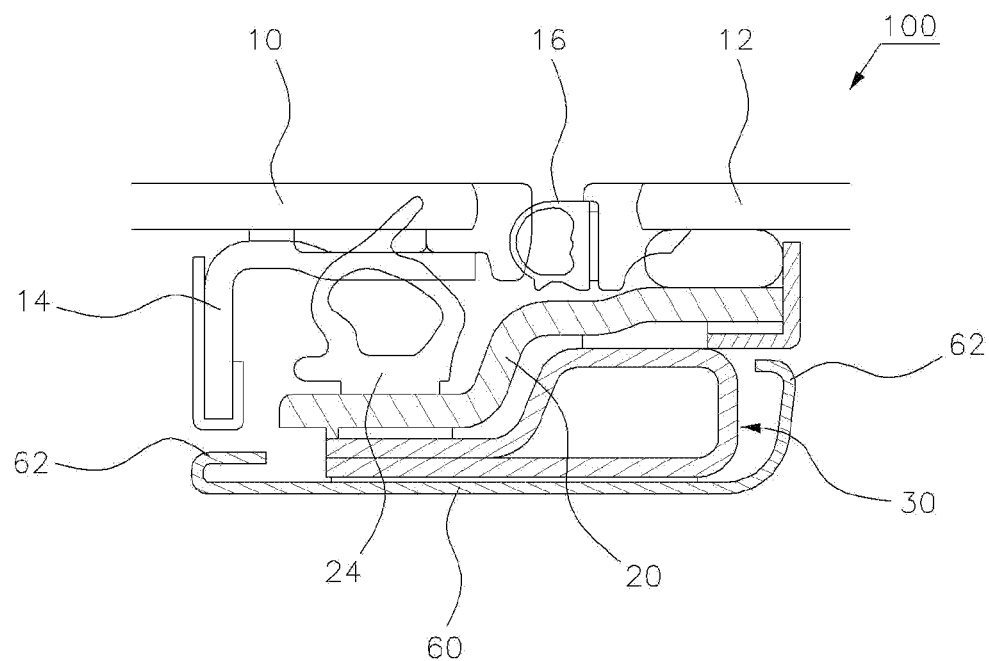
FIG. 3 is a cross-sectional view taken along line A-A of FIG. 2.

Specifically, as illustrated in FIG. 3, at the center portion 100 of the panoramic sunroof, a support panel 14 is coupled to a lower portion of the front glass 10 so as to support the front glass 10, and the frame 20 is tightly attached and coupled to the lower portion of the rear glass 12 so as to serve to fix the rear glass 12.

As illustrated in FIG. 3, the frame 20 is formed in a shape that is bent downward at a center or a center portion thereof, and then bent again in a horizontal direction or substantially in a horizontal direction, and one side of the frame 20 is joined to a lower surface of the rear glass 12 by welding or the like.

As illustrated in FIG. 3, a weather strip 24 is coupled to an upper surface at the other side of the frame 20 so as to block external foreign substances from flowing in between the front glass 10 and the frame 20, and a rear glass seal 16 is coupled at a front end of the rear glass 12 so as to block external foreign substances from flowing in between the front glass 10 and the rear glass 12.

As illustrated in FIG. 3, the first center reinforcement 30, which is made such as by a process of roll forming the steel plate, is coupled to the lower portion of the frame 20 so as to serve to reinforce rigidity of the center portion 100 of the panoramic sunroof.

Figure 4:
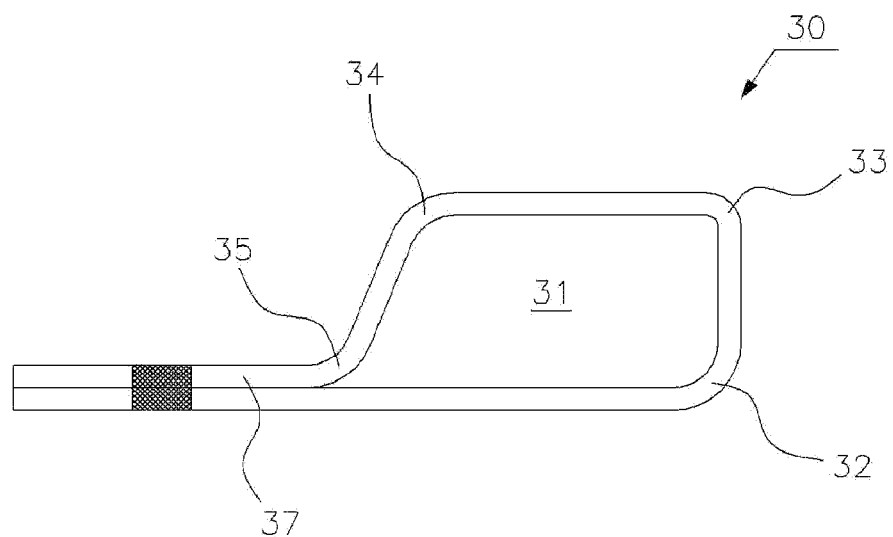
FIG. 4 is a cross-sectional view illustrating an appearance of an exemplary first center reinforcement according to the present invention.

Specifically, as illustrated in FIG. 4, the first center reinforcement 30 has the first closed cross-sectional portion 31 that is formed such as by bending a center portion of the steel plate upward at a first bent portion 32, bending the steel plate in the horizontal direction or substantially in the horizontal direction at a second bent portion 33, and then bending the steel plate downward at a third bent portion 34 so as to form a closed space, a cross section of which is quadrangular or substantially quadrangular.

Thereafter, the first joint portion 37 is formed by bending again the steel plate in the horizontal direction or substantially in the horizontal direction at a fourth bent portion 35, and joining both ends of the steel plate together so that both ends of the steel plate are in surface contact with each other, and the first joint portion 37 is formed by joining the ends of the steel plate by spot welding or the like.

The spot welding refers to an electric resistance welding method that is performed by placing ends of electrodes on upper and lower surfaces of stacked metallic plates, applying an electric current and concentrating pressing force on comparatively small portions, locally heating the metallic plates, and simultaneously, applying pressure to the metallic plates using the electrodes, and has an advantage in that corrosion hardly occurs on a vehicle body even when a long period of time has passed in comparison with other welding methods.

That is, as illustrated in FIG. 4, a cross section of the first center reinforcement 30 includes the first closed cross-sectional portion 31 that has a quadrangular or substantially quadrangular shape, and the first joint portion 37 that is formed by overlapping the ends of the plate in parallel or substantially in parallel in the horizontal direction or substantially in the horizontal direction, and has a closed cross-sectional structure unlike the center reinforcement 4 in the related art which is illustrated in FIG. 1 and has an open cross-sectional structure, thereby remarkably improving rigidity in comparison with the center reinforcement 4 in the related art.

Unlike the center reinforcement 4 in the related art which is illustrated in FIG. 1 and formed to be elongated in a forward and rearward direction of the vehicle in order to satisfy a rigidity condition, the first center reinforcement 30 according to the present invention, which is illustrated in FIG. 3, has sufficient rigidity, and thus may have a length in the forward and rearward direction that is shorter than that of the center reinforcement 4 in the related art. Accordingly, an overall width of the center portion 100 of the panoramic sunroof may also be remarkably reduced in comparison with that in the related art, thereby improving visibility and openness of an occupant seated on a back seat in the vehicle.

As illustrated in FIGS. 3 and 4, an upper surface of the first closed cross-sectional portion 31 may be joined to one side of the lower surface of the frame 20, and an upper surface of the first joint portion 37 may be joined to the other side of the lower surface of the frame 20.

That is, as illustrated in FIGS. 3 and 4, a portion between the second bent portion 33 and the third bent portion 34 is joined to the one side of the lower surface of the frame 20, and a portion between the fourth bent portion 35 and an end of the first joint portion 37 is joined to the other side of the lower surface of the frame 20.

As a method of joining the first center reinforcement 30 and the frame 20, a welding method, a joint method using a sealer, or the like may be used, and the welding method has an advantage in that joint rigidity between the first center reinforcement 30 and the frame 20 is improved, and the joint method using the sealer has an advantage in that sealability between the first center reinforcement 30 and the frame 20 is improved.

Figure 5:
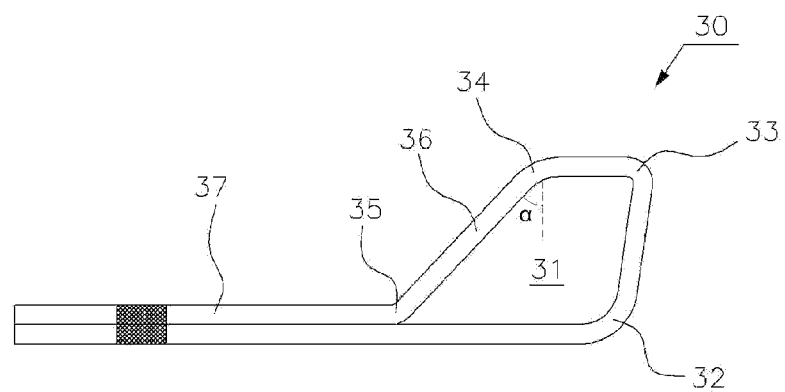
FIG. 5 is a cross-sectional view illustrating an appearance of another exemplary first center reinforcement according to the present invention.

As illustrated in FIG. 5, one side surface of the first closed cross-sectional portion 31 is formed as an inclined surface 36 having a predetermined angle α with respect to a vertical direction, and the first closed cross-sectional portion 31 may have a cross section having a trapezoidal or substantially trapezoidal shape by including the inclined surface 36.

That is, as illustrated in FIG. 5, a portion between the third bent portion 34 and the fourth bent portion 35 of the first center reinforcement 30 is formed as the inclined surface 36 instead of a vertical surface, and this structure provides a space that allows a plurality of center reinforcements to be easily disposed when the plurality of center reinforcements is provided instead of a single center reinforcement, as will be described below.

The angle α of the inclined surface 36 formed at the first closed cross-sectional portion 31 may be about 30° to about 60°, and in the illustrated exemplary embodiment, the angle α of the inclined surface 36 is about 45°.

Therefore, the inclination angle α of the inclined surface 36 with respect to the vertical direction, that is, about 45°, is the same or substantially the same as the inclination angle with respect to the horizontal direction, and this structure maximally increases rigidity of the first center reinforcement 30.

Figure 6:
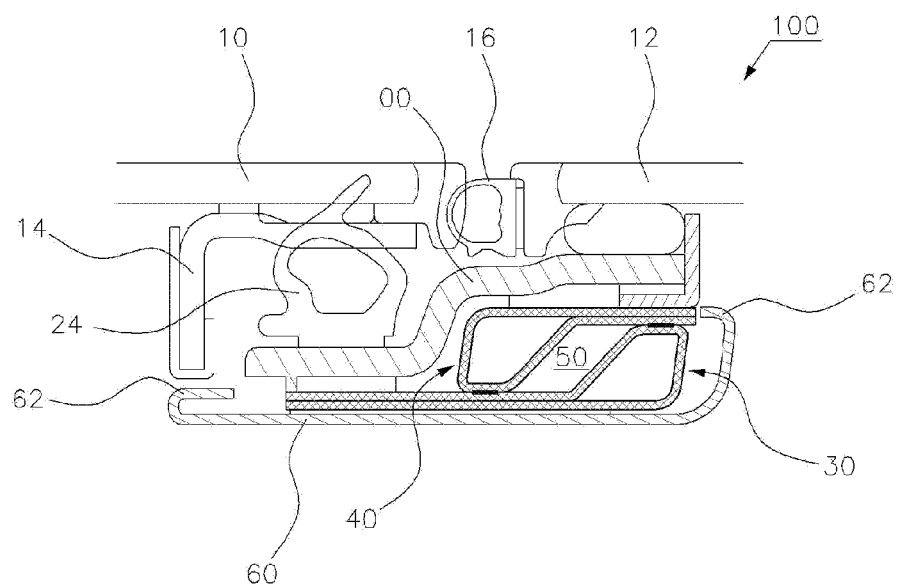
FIG. 6 is a cross-sectional view illustrating yet another exemplary center reinforcement structure of a panoramic sunroof according to the present invention.

As illustrated in FIG. 6, a second center reinforcement 40 having a shape similar to that of the first center reinforcement 30 may be coupled between the first center reinforcement 30 and the frame 20.

Figure 7:
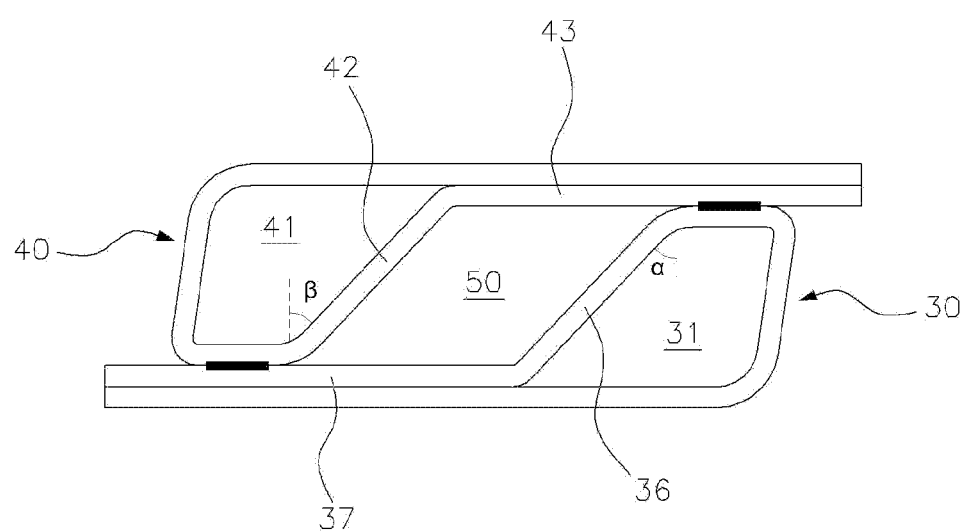
FIG. 7 is a cross-sectional view illustrating an appearance of an exemplary first center reinforcement and an exemplary second center reinforcement according to the present invention.

As illustrated in FIG. 7, like the first center reinforcement 30, the second center reinforcement 40 includes a second closed cross-sectional portion 41 that is formed at one side of the second center reinforcement 40 such as by sequentially bending a plate, and a second joint portion 43 that is formed at the other side of the second center reinforcement 40 by overlapping both ends of the plate in parallel or substantially in parallel, and the second center reinforcement 40 is disposed in a shape that is formed by reversing the top and bottom and the left and right of the shape of the first center reinforcement 30.

That is, as illustrated in FIG. 7, the second center reinforcement 40 and the first center reinforcement 30 are symmetric or substantially symmetric about the vertical axis and the horizontal axis, and a lower surface of the second closed cross-sectional portion 41 of the second center reinforcement 40 is joined to an upper surface of the first joint portion 37 of the first center reinforcement 30, and a lower surface of the second joint portion 43 of the second center reinforcement 40 is joined to an upper surface of the first closed cross-sectional portion 31 of the first center reinforcement 30.

Like the aforementioned method of joining the first center reinforcement 30 and the frame 20, a welding method, a joint method using a sealer, or the like may be used as a method of joining the first center reinforcement 30 and the second center reinforcement 40.

As illustrated in FIG. 7, a third closed cross-sectional portion 50, which is surrounded by the first closed cross-sectional portion 31, the first joint portion 37, the second closed cross-sectional portion 41, and the second joint portion 43, is formed between the first closed cross-sectional portion 31 and the second closed cross-sectional portion 41.

That is, the center reinforcement structure of the panoramic sunroof according to various embodiments of the present invention, which includes both the first center reinforcement 30 and the second center reinforcement 40, has three closed cross-sectional portions including the first closed cross-sectional portion 31, the second closed cross-sectional portion 41, and the third closed cross-sectional portion 50.

In the illustrated exemplary embodiment, the center reinforcement structure has two center reinforcements including the first center reinforcement 30, and the second center reinforcement 40, but the number of center reinforcements may be varied depending on a type of vehicle, a rigidity condition required for the center portion 100 of the panoramic sunroof, and the like, and accordingly, the number of closed cross-sectional portions may be varied.

As illustrated in FIG. 7, one side surface of the first closed cross-sectional portion 31 is formed as the inclined surface 36 having a predetermined angle α, with respect to the vertical direction, as described above, and like the inclined surface 36 of the first closed cross-sectional portion 31, one side surface of the second closed cross-sectional portion 41 may also be formed as an inclined surface 42 having a predetermined angle β.

The angle α of the inclined surface 36 of the first closed cross-sectional portion 31 and the angle β of the inclined surface 42 of the second closed cross-sectional portion 41 may be equal to each other, and the angle α of the inclined surface 36 formed at the first closed cross-sectional portion 31 and the angle β of the inclined surface 42 formed at the second closed cross-sectional portion 41 may be about 30° to about 60°.

In the illustrated exemplary embodiment, the angle α of the inclined surface 36 formed at the first closed cross-sectional portion 31 and the angle β of the inclined surface 42 formed at the second closed cross-sectional portion 41 are about 45°, and this structure maximally increases rigidity of the center reinforcement, as described above.

As illustrated in FIG. 7, the second joint portion 43 and the first joint portion 37 may be disposed in parallel or substantially in parallel with each other at the top and bottom sides of the third closed cross-sectional portion 50, and the inclined surface 42 of the second closed cross-sectional portion 41 and the inclined surface 36 of the first closed cross-sectional portion 31 may be disposed in parallel or substantially in parallel with each other at the left and right sides of the third closed cross-sectional portion 50.

That is, the third closed cross-sectional portion 50 is formed to have a cross section having a parallelogram or substantially parallelogram shape, and in the illustrated exemplary embodiment, angles at vertices of the third closed cross-sectional portion 50, which face each other, are 45° and 135°, respectively.

As illustrated in FIGS. 3 and 6, a center cover 60, which has a 'U'-shaped cross section, is coupled to a lower portion of the first center reinforcement 30, and both ends of the cross section of the center cover 60 may be bent inward to form bent portions 62 of the center cover. The bent portions 62 formed at the center cover 60 serve to prevent a worker who assembles the panoramic sunroof or an occupant seated in the vehicle from being injured due to both ends of the center cover 60.

As illustrated in FIGS. 3 and 6, a height of a front side of the center cover 60 may be smaller than a height of a rear side of the center cover 60, and specifically, in some embodiments, the height of the front side of the center cover 60 may be equal to a height of the first joint portion 37, and the height of the rear side of the center cover 60 may be equal to a height of the first closed cross-sectional portion 31.

For convenience in explanation and accurate definition in the appended claims, the terms "upper" or "lower", "front" or "rear", "left" or "right", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A center reinforcement structure of a panoramic sunroof coupled in a vehicle width direction between a front glass and a rear glass disposed at a ceiling of a vehicle, the center reinforcement structure comprising:
   a frame disposed in the vehicle width direction, and having one end attached and fixedly coupled to a lower portion of the rear glass; and
   a first center reinforcement coupled to a lower portion of the frame, and having a first closed cross-sectional portion formed at a first side of the first center reinforcement by sequentially bending a first plate so as to provide a first closed space, and a first joint portion formed at a second side of the first center reinforcement by overlapping both ends of the first plate substantially in parallel so that the both ends of the first plate are in surface contact with each other,
   wherein the frame is formed in a shape bent downward at a center portion of the frame, and also bent in a substantially horizontal direction, the frame having a shape substantially identical to a shape of an upper surface of the first center reinforcement, and
   wherein an upper surface of the first closed cross-sectional portion of the first center reinforcement is joined to a first side of the lower portion of the frame, and an upper surface of the first joint portion of the first center reinforcement is joined to a second side of the lower portion of the frame.

2. The center reinforcement structure of claim 1, wherein the upper surface of the first closed cross-sectional portion of the first center reinforcement is joined to the first side of the lower portion of the frame by welding or a sealer, and the upper surface of the first joint portion of the first center reinforcement is joined to the second side of the lower portion of the frame by welding or a sealer.

3. The center reinforcement structure of claim 1, wherein a first side surface of the first closed cross-sectional portion is formed as an inclined surface having a predetermined angle with respect to a vertical direction, and the first closed cross-sectional portion has a cross section having a substantially trapezoidal shape.

4. The center reinforcement structure of claim 1, further comprising:
   a second center reinforcement coupled between the frame and the first center reinforcement, and having a second closed cross-sectional portion formed at a first side of the second center reinforcement by sequentially bending a second plate so as to provide a second closed space, and a second joint portion formed at a second side of the second center reinforcement by overlapping both ends of the second plate substantially in parallel so that the both ends of the second plate are in surface contact with each other,
   wherein the second center reinforcement and the first center reinforcement are substantially symmetrically disposed with respect to a vertical axis and a horizontal axis, and a lower surface of the second closed cross-sectional portion is joined to an upper surface of the first joint portion, and a lower surface of the second joint portion is joined to an upper surface of the first closed cross-sectional portion, such that a third closed cross-sectional portion is formed between the first closed cross-sectional portion and the second closed cross-sectional portion.

5. The center reinforcement structure of claim 4, wherein the lower surface of the second closed cross-sectional portion of the second center reinforcement is joined to the upper surface of the first joint portion of the first center reinforcement by welding or a sealer, and the lower surface of the second joint portion of the second center reinforcement is joined to the upper surface of the first closed cross-sectional portion of the first center reinforcement by welding or a sealer.

6. The center reinforcement structure of claim 4, wherein a first side surface of the first closed cross-sectional portion is formed as a first inclined surface having a first predetermined angle with respect to the vertical direction, the first side surface of the second closed cross-sectional portion, which faces the first inclination surface of the first closed cross-sectional portion, is formed as a second inclined surface having a second predetermined angle with respect to the vertical direction, and the first predetermined angle and the second predetermined angle are substantially equal to each other.

7. The center reinforcement structure of claim 4, wherein the third closed cross-sectional portion is surrounded by the first closed cross-sectional portion, the first joint portion, the second closed cross-sectional portion, and the second joint portion, the first inclined surface of the first closed cross-sectional portion and the second inclined surface of the second closed cross-sectional portion are disposed substantially in parallel with each other, and the first joint portion and the second joint portion are disposed substantially in parallel with each other, such that a cross section of the third closed cross-sectional portion is formed in a substantially parallelogram shape.

8. The center reinforcement structure of claim 4, further comprising:
   a center cover coupled to a lower portion of the first center reinforcement, and having a 'U'-shaped cross section, wherein both ends of a cross section of the center cover are bent inward.

* * * * *